(12) United States Patent
Nagel et al.

(10) Patent No.: US 10,549,741 B2
(45) Date of Patent: Feb. 4, 2020

(54) ELECTROMECHANICAL BRAKE BOOSTER AND BRAKING SYSTEM

(71) Applicant: Robert Bosch GmbH, Stuttgart (DE)

(72) Inventors: Willi Nagel, Remseck/Hochdorf (DE); Daniel Weissinger, Korntal-Muenchingen (DE); Giammaria Panunzio, Ludwigsburg (DE); Andre Bollwerk, Steinheim An der Murr (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/759,654

(22) PCT Filed: Jul. 18, 2016

(86) PCT No.: PCT/EP2016/067004
§ 371 (c)(1),
(2) Date: Mar. 13, 2018

(87) PCT Pub. No.: WO2017/045803
PCT Pub. Date: Mar. 23, 2017

(65) Prior Publication Data
US 2019/0047531 A1 Feb. 14, 2019

(30) Foreign Application Priority Data

Sep. 14, 2015 (DE) ........................ 10 2015 217 520

(51) Int. Cl.
*B60T 13/64* (2006.01)
*B60T 13/74* (2006.01)
(Continued)

(52) U.S. Cl.
CPC .......... *B60T 13/745* (2013.01); *B60T 13/575* (2013.01); *B60T 8/4077* (2013.01)

(58) Field of Classification Search
CPC ...... B60T 13/74; B60T 13/575; B60T 13/745; B60T 13/746; B60T 11/18; B60T 11/20
(Continued)

(56) References Cited

U.S. PATENT DOCUMENTS 4,270,353 A * 6/1981 Thomas .............. B60T 13/5675
60/547.1
4,339,921 A * 7/1982 Schanz ............... B60T 13/5675
60/547.1
(Continued)

FOREIGN PATENT DOCUMENTS

CN 203005406 U 6/2013
DE 2845794 A1 4/1979
(Continued)

OTHER PUBLICATIONS

International Search Report dated Sep. 28, 2016 of the corresponding International Application PCT/EP2016/067004 filed Jul. 18, 2016.

*Primary Examiner* — Christopher P Schwartz
(74) *Attorney, Agent, or Firm* — Norton Rose Fulbright US LLP; Gerard Messina

(57) ABSTRACT

An electromechanical brake booster of a braking system of a motor vehicle includes at least one support element (a) that extends essentially in parallel to an adjustment axis of a spindle, (b) that is attached to a gearbox housing bottom of the gearbox, (c) to which a master brake cylinder is attachable, and (d) that is designed to support forces acting on the at least one support element in the axial and/or radial direction.

10 Claims, 5 Drawing Sheets

(51) Int. Cl.
*B60T 13/575* (2006.01)
*B60T 8/40* (2006.01)

(58) Field of Classification Search
USPC .................. 303/114.1, 115.2, 115.3; 60/545
See application file for complete search history.

(56) References Cited

U.S. PATENT DOCUMENTS

| | | | | |
|---|---|---|---|---|
| 4,592,438 | A * | 6/1986 | Spielmann | B60T 13/5675 180/89.1 |
| 6,050,174 | A * | 4/2000 | Schonlau | B60T 13/5675 60/403 |
| 6,324,845 | B1 * | 12/2001 | Fulks | B60T 13/52 60/397 |
| 7,823,384 | B2 * | 11/2010 | Ikeda | B60T 13/746 60/545 |
| 9,108,610 | B2 * | 8/2015 | Philippe | B60T 13/745 |
| 9,701,296 | B2 * | 7/2017 | Zhang | B60T 13/745 |
| 2004/0089149 | A1 * | 5/2004 | Kasselman | B60T 13/5675 92/169.3 |
| 2006/0112819 | A1 | 6/2006 | Tsubouchi | |
| 2009/0184569 | A1 * | 7/2009 | Inagaki | B60T 13/567 303/115.3 |
| 2010/0242469 | A1 * | 9/2010 | Jungbecker | B60T 13/745 60/594 |
| 2013/0192222 | A1 * | 8/2013 | Nomura | B60T 13/745 60/545 |
| 2018/0251115 | A1 * | 9/2018 | Nagel | F16H 25/20 |

FOREIGN PATENT DOCUMENTS

| | | |
|---|---|---|
| DE | 2830262 A1 | 1/1980 |
| DE | 3203495 A1 | 8/1983 |
| DE | 19734290 A1 | 2/1999 |
| DE | 102013204692 A1 | 10/2013 |
| DE | 102012014361 A1 | 1/2014 |
| DE | 102013208672 A1 | 11/2014 |
| EP | 2292483 A1 | 3/2011 |
| FR | 2947228 A1 | 12/2010 |
| JP | 2007321787 A | 12/2007 |
| JP | 2014008894 A | 1/2014 |
| WO | 2014012702 A1 | 1/2014 |

* cited by examiner ated Jul. 18, 2016, and claims priority under 35 U.S.C. § 119 to DE 10 2015 217 520.0, filed in the Federal Republic of Germany on Sep. 14, 2015, the content of each of which are incorporated herein by reference in their entireties.

ELECTROMECHANICAL BRAKE BOOSTER AND BRAKING SYSTEM

CROSS-REFERENCE TO RELATED APPLICATIONS

The present application is the national stage of International Pat. App. No. PCT/EP2016/067004 filed Jul. 18, 2016, and claims priority under 35 U.S.C. § 119 to DE 10 2015 217 520.0, filed in the Federal Republic of Germany on Sep. 14, 2015, the content of each of which are incorporated herein by reference in their entireties.

FIELD OF THE INVENTION

The present invention relates to an electromechanical brake booster for a motor vehicle. The present invention also relates to a braking system.

BACKGROUND

Alternative brake pressure buildup devices are needed for future drive concepts since there is little or no vacuum to operate a conventional vacuum brake booster. For this purpose, electric motor-assisted brake boosters were developed.

DE 10 2012 014 361 A1 describes an actuating unit for a master brake cylinder of a motor vehicle, including a housing for arrangement between the master brake cylinder and a brake pedal, through which a pressure member for actuating an actuating piston of the master brake cylinder extends, an electric motor, a worm gear driven by the electric motor and intersecting the pressure member, and a gearbox which is situated in the housing and couples the worm gear to the actuating piston in such a way that a rotational movement of the worm gear is translated into a translational movement of the actuating piston.

SUMMARY

An object of the present invention to provide an improved electromechanical brake booster which has lower manufacturing costs, a reduced weight, and a reduced length.

According to example embodiments of the present invention, an electromechanical brake booster for a motor vehicle includes at least one support element that extends essentially in parallel to an adjustment axis of a spindle and that is attached to a gearbox housing bottom of the gearbox, where a master brake cylinder is attachable to the at least one support element, and the at least one support element supports forces acting on the at least one support element in the axial and/or radial direction.

According to example embodiments of the present invention, a braking system includes such an electromechanical brake booster and a master brake cylinder which is actuatable by the electromechanical brake booster.

According to an example embodiment, forces resulting from the customer interface as well as gearbox reaction forces can be absorbed by the at least one support element to which the master brake cylinder is attachable. The housing of the electromechanical brake booster composed of two housing shells or halves thus does not have to be designed to absorb the above-mentioned forces. This allows weight and costs to be reduced, and the length of the electromechanical brake booster to be decreased.

According to a further preferred example embodiment, a housing of the electromechanical brake booster includes a first housing half, in which the gearbox is situated, and a second housing half, which, at a first axial end section, is attached to the first housing half and, at a second axial end section, is attachable to the master brake cylinder. Due to the master brake cylinder being attachable to the at least one support element, the at least one support element extends from the first housing half through the second housing half and is connectable there to the master brake cylinder. The at least one support element thus acts as a support structure of the electromechanical brake booster, with the result that the housing thus no longer has a support function.

According to a further preferred example embodiment, the least one support element is essentially cylindrical, the first housing half being attached to the second housing half by at least one fastener situated on the at least one support element, and the master brake cylinder being attachable to the at least one support element with the aid of the at least one fastener. The first housing half is thus advantageously attachable in a simple manner to the second housing half of the housing by providing the at least one fastener. Furthermore, the master brake cylinder is attachable in a simple manner to the second housing half of the housing by the at least one fastener.

According to a further preferred example embodiment, the first housing half is attachable at a fastening point on a firewall of the motor vehicle, the at least one support element extending through an opening formed in the gearbox housing bottom, and the at least one support element being attachable at the fastening point of the firewall of the motor vehicle. The at least one support element thus has both the function of a support structure of the electromechanical brake booster and of the fastening of the electromechanical brake booster on the firewall of the motor vehicle.

According to a further preferred example embodiment, the first housing half is attachable at a further fastening point on the firewall of the motor vehicle, an essentially cylindrical fastener being connected to the gearbox housing bottom and attachable to the further fastening point of the firewall of the motor vehicle. The electromechanical brake booster thus advantageously includes a further fastener for attaching the electromechanical brake booster on the firewall of the motor vehicle, where, on the one hand, the fastening of the electromechanical brake booster on the firewall of the motor vehicle can be reinforced and, on the other hand, an angular position of an installation position of the electromechanical brake booster has an improved variability.

According to a further preferred example embodiment, it is provided that the at least one support element is pressed into an opening formed in the gearbox housing bottom, a collar formed at a first axial end section of the at least one support element resting against the gearbox housing bottom. The at least one support element is thus advantageously fixedly connected in a simple manner flush with the gearbox housing bottom.

According to a further preferred example embodiment, a knurl, which has a larger length than a thickness of the gearbox housing bottom, is formed at the first axial end section of the at least one support element adjoining the collar, the knurl being pressed into the opening formed in the gearbox housing bottom, the knurl situated in a protruding manner on a side of the gearbox housing bottom situated opposite the press-in side being calked or pressed. By pressing the knurl into the gearbox housing bottom on a first side of the gearbox housing bottom, and calking or pressing the knurl situated in a protruding manner on the opposite side of the gearbox housing bottom, the at least one support element is attachable to the gearbox housing bottom in a simple, secure and reliable manner.

According to a further preferred example embodiment, the gearbox housing bottom includes a passage having an internal thread, the passage accommodating an axial end section of the at least one support element. The at least one support element is thus attachable to the gearbox housing bottom in a simple manner and has a detachable joint.

According to a further preferred example embodiment, it is provided that the at least one support element includes a tie rod or a through bolt, the tie rod or the through bolt being made of steel. The at least one support element is thus designed to absorb forces resulting from the customer interface as well as gearbox reaction forces.

According to a further preferred example embodiment, the first housing half is designed as an aluminum die-cast housing, and the second housing half is designed as a plastic housing, or the first housing half and the second housing half are designed as steel sheet housings. The selection of the material for the first housing half and the second housing half is thus adaptable to individual requirements with regard to the housing.

The described embodiments and refinements can be combined with each other in various ways.

Further possible embodiments, refinements and implementations of the present invention also include not explicitly described combinations of features of the present invention which are described at the outset or hereafter with respect to the exemplary embodiments.

The accompanying drawings, in which identical reference numerals denote identical or functionally equivalent elements, parts or components, unless indicated otherwise, are intended to provide a further understanding of the present invention. They illustrate example embodiments and, in conjunction with the description, are used to explain principles and concepts of the present invention.

Other specific embodiments and many of the described advantages result with respect to the drawings. The elements shown in the drawings are not necessarily illustrated true to scale in relation to each other.

DETAILED DESCRIPTION

Figure 1:
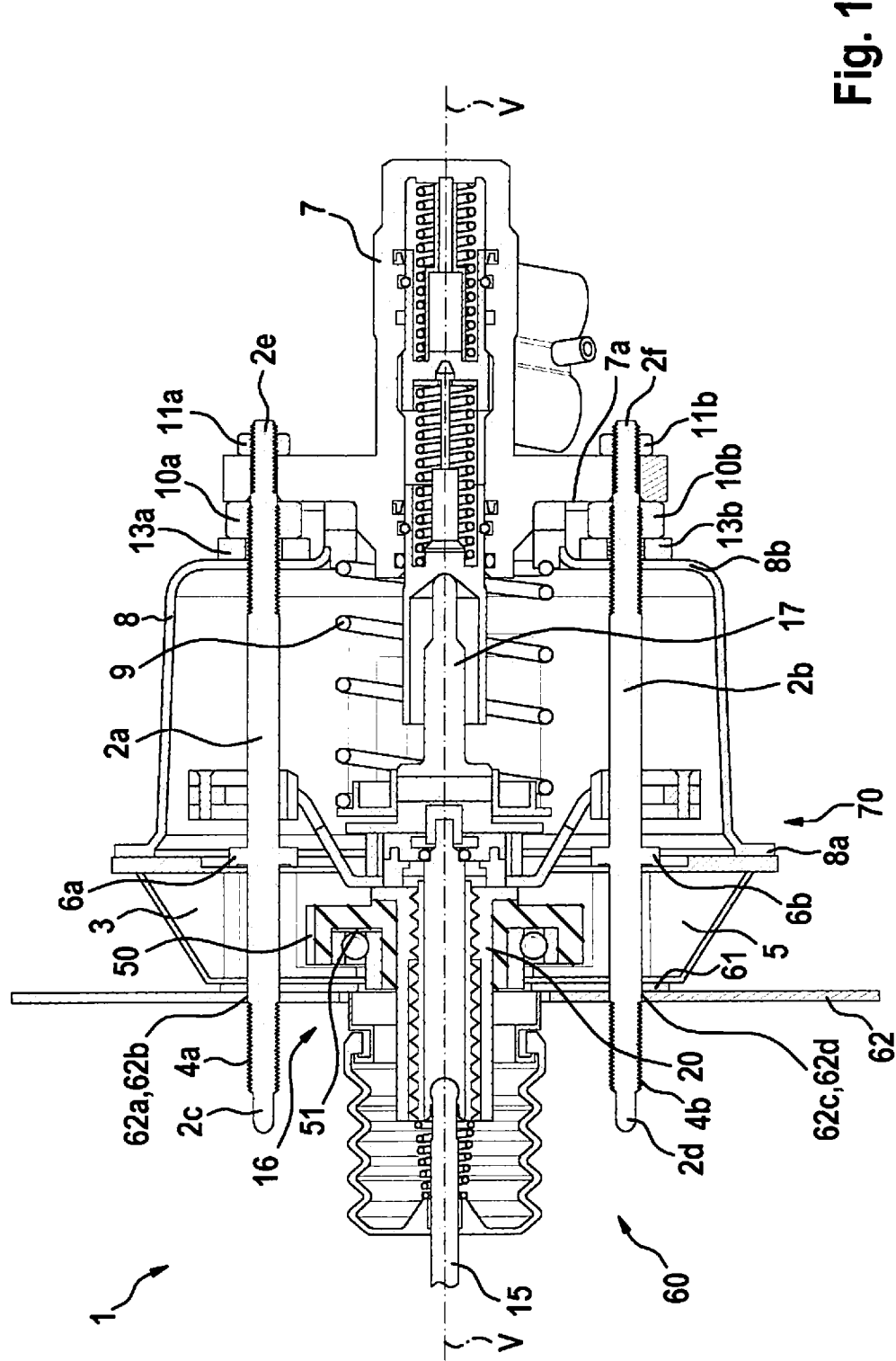
FIG. 1 shows a longitudinal sectional view of an electromechanical brake booster for a motor vehicle according to an example embodiment of the present invention.

FIG. 1 shows a longitudinal sectional view of an electromechanical brake booster for a motor vehicle according to a preferred example embodiment of the present invention.

Electromechanical brake booster 1 includes an electric motor (not shown in FIG. 1), which is connected via a gearbox 60 to an output rod 17. A rotation of a rotor of the electric motor is convertible into a translational movement of output rod 17. A first support element 2a and a second support element 2b are attached to a gearbox housing bottom 61 of gearbox 60. First support element 2a and second support element 2b extend essentially in parallel to an adjustment axis V of output rod 17. Preferably, a master brake cylinder 7 is attachable to first support element 2a and to second support element 2b. First support element 2a and second support element 2b are designed to support forces acting on first support element 2a and second support element 2b in the axial and/or radial direction.

A housing 70 of electromechanical brake booster 1 preferably includes a first housing half 5 and a second housing half 8. Preferably, gearbox 60 is situated in first housing half 5. Second housing half 8 is preferably attached at a first axial end section 8a to first housing half 5, and at a second axial end section 8b to master brake cylinder 7.

First support element 2a and second support element 2b have an essentially cylindrical design. Alternatively, first support element 2a and second support element 2b can also have another suitable shape.

First housing half 5 is preferably attachable at a first fastening point 62a and at a second fastening point 62b on firewall 62 of the motor vehicle. First support element 2a and second support element 2b preferably extend through an opening (not shown in FIG. 1) formed in gearbox housing bottom 61. Furthermore, first support element 2a is preferably attachable at first fastening point 62a of firewall 62 of the motor vehicle. Moreover, second support element 2b is preferably attachable at second fastening point 62b of firewall 62 of the motor vehicle.

First support element 2a and second support element 2b are preferably designed as tie rods made of steel. Alternatively, first support element 2a and second support element 2b, for example, may be made of another suitable material and may have another suitable design.

First housing half 5 is preferably designed as an aluminum die-cast housing. Second housing half 8 is preferably designed as a plastic housing. Alternatively, first housing half 5 and/or second housing half 8 can also be made of another suitable material and in another suitable production type.

First support element 2a and second support element 2b are preferably pressed into housing boreholes of first housing half 5 at a pressing length 3, which preferably extends across an entire width of first housing half 5. A thread 4a of first support element 2a and a thread 4b of second support element 2b are screwed by the manufacturer to a brake pedal bearing bracket (not shown in FIG. 1) and clamp first housing half 5 or gearbox housing between a collar 6a of first support element 2a and firewall 62 of the motor vehicle.

Moreover, first housing half 5 is preferably clamped between a collar 6b of second support element 2b and firewall 62 of the motor vehicle. The preferably screwed first support element 2a and the preferably screwed second support element 2b are autonomously stable and able to absorb forces in all directions, in particular tensile forces of master brake cylinder 7.

First fastener 10a situated on first support element 2a is preferably formed by a screw nut and is situated at a second axial end section 2e of first support element 2a. Due to this screw nut, a flange 7a of master brake cylinder 7 includes a stop at first fastener 10a. A foam gasket 13a is preferably pressed between first fastener 10a and second housing half 8. A further fastener 11a is preferably situated on first support element 2a on a side of master brake cylinder 7 facing away from the housing and clamps flange 7a of master brake cylinder 7 against the stop.

Second fastener 10b situated on second support element 2b is preferably formed by a screw nut and is situated at a second axial end section 2f of second support element 2b. Due to this screw nut, flange 7a of master brake cylinder 7 includes a stop at second fastener 10b. A foam gasket 13b is preferably pressed between second fastener 10b and second housing half 8. A further fastener 11b is preferably situated on second support element 2b on the side of master brake cylinder 7 facing away from the housing and clamps flange 7a of master brake cylinder 7 against the stop.

Second housing half 8 is preferably screwed to first housing half 5. A return spring 9 for restoring output rod 17 is preferably supported on second housing half 8. Second housing half 8 preferably predominantly has a sealing and protection function and is thus made of plastic material.

A braking force of a driver of the motor vehicle on an input rod 15 is preferably boosted with the aid of the electric motor via gearbox 16. Servo assistance and the driver's force combined actuate master brake cylinder 7 via output rod 17.

In the die-cast design of the housing of electromechanical brake booster 1, ABS pulsations result in high mechanical stresses. The axial forces are supported via a spindle nut 20 on an inner plate-shaped area of a plastic gear wheel 50. On an outer plate-shaped area of plastic gear wheel 50, the axial force transitions into the ball bearing outer ring. During ABS pulsations, the plate-shaped plastic area deflects and damps the ABS pulsations. The maximum spring travel defines a gap 51 between the gear wheel and the ball bearing inner ring. A loading of gear wheel 50, in particular at high temperatures, is preferably avoided in that gap 51 is overcome, and the gear wheel hits the end stop on the ball bearing inner ring.

Figure 2:
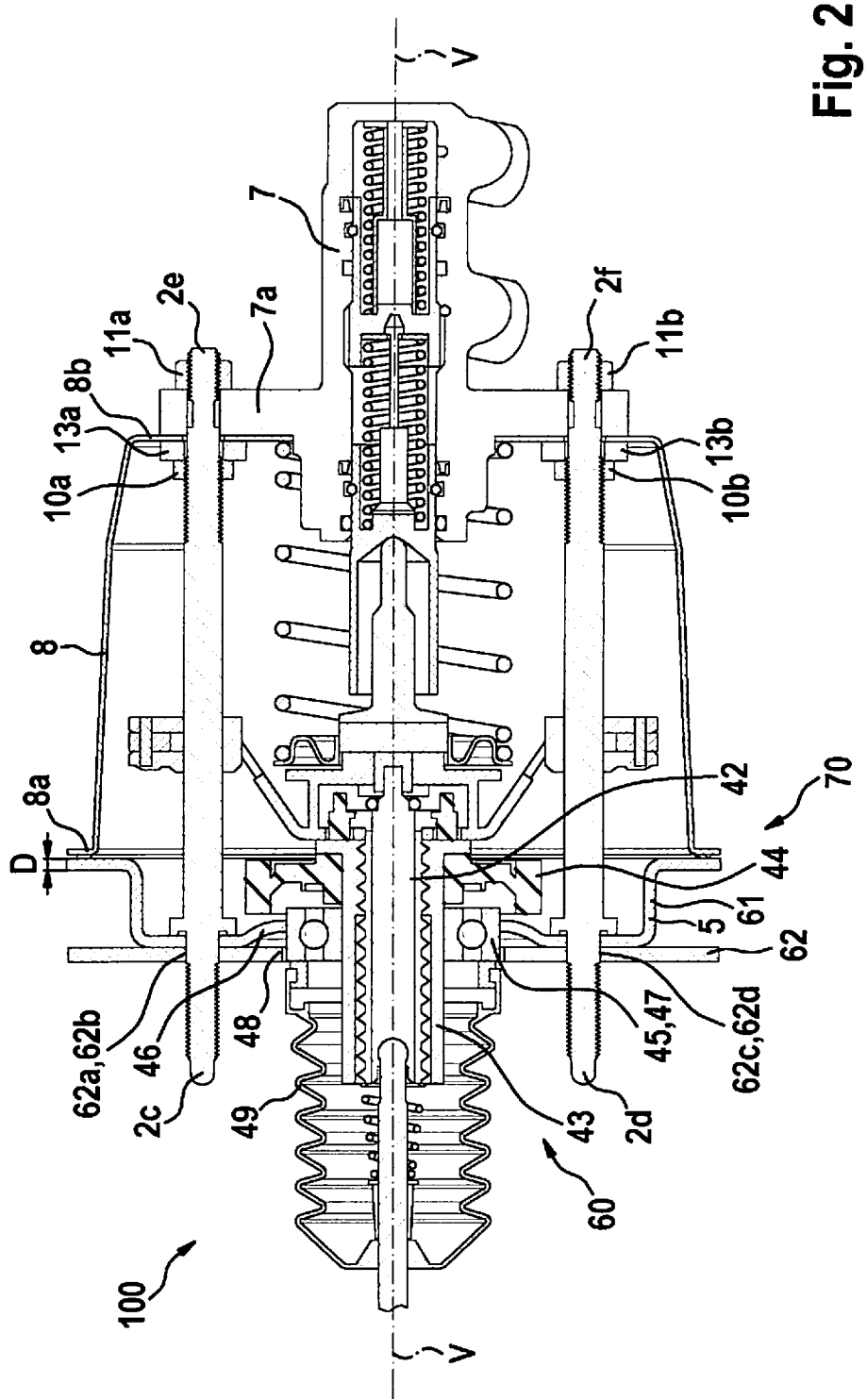
FIG. 2 shows a longitudinal sectional view of the electromechanical brake booster for the motor vehicle according to a further example embodiment of the present invention.

FIG. 2 shows a longitudinal sectional view of the electromechanical brake booster 100 for the motor vehicle according to a further preferred example embodiment of the present invention.

In this example embodiment, first support element 2a and second support element 2b are preferably formed by a through bolt made of steel. Alternatively, first support element 2a and second support element 2b, for example, can be made of another suitable material and/or can have another suitable design.

First housing half 5 and second housing half 8 are preferably each designed as steel sheet housings. Alternatively, it is also conceivable for these to be made of another suitable material.

First fastener 10a situated on first support element 2a is preferably formed by a screw nut. First fastener 10a is preferably situated on an inner side of second axial end section 8b of second housing half 8 and fastens first support element 2a to second housing half 8. A foam gasket 13a is preferably pressed between first fastener 10a and second housing half 8. A further fastener 11a is preferably situated on first support element 2a on a side of master brake cylinder 7 facing away from the housing and clamps flange 7a of master brake cylinder 7 against the stop of second housing half 8.

First fastener 10b situated on second support element 2b is preferably formed by a screw nut. Second fastener 10b is preferably situated on an inner side of second axial end section 8b of second housing half 8 and fastens second support element 2b to second housing half 8. A foam gasket 13b is preferably pressed between second fastener 10b and second housing half 8. A further fastener 11b is preferably situated on second support element 2b on a side of master brake cylinder 7 facing away from the housing and clamps flange 7a of master brake cylinder 7 against the stop of second housing half 8.

First support element 2a and second support element 2b are preferably pressed into or fixed in first housing half 5. The press-in length preferably corresponds to a sheet metal thickness of first housing half 5. To ensure a guidance of first support element 2a and second support element 2b in first housing half 5 and in second housing half 8, first support element 2a and second support element 2b are, as described above, also fastened or clamped to an inner side of second housing half 8. Second housing half 8, which for weight and stability reasons is made of thin-walled sheet steel or, alternatively, of another metal sheet, is preferably an integral part of the support structure of the electromechanical brake booster. Second housing half 8 is preferably connected on the gearbox housing side, i.e., to first housing half 5, with the aid of rivets or alternatively with the aid of screws. On the master brake cylinder side, second housing half 8 is preferably clamped between fastener 10a, 10b and flange 7a of master brake cylinder 7 and fastener 11a, 11b.

In this way, first support element 2a and second support element 2b are preferably stabilized and able to absorb all forces and torques. The function of the bearing shield (not shown in FIG. 2) is preferably assumed by second housing half 8 and is thus replaced. First support element 2a and second support element 2b, first housing half 5 and second housing half 8 are preferably made of the same material, which in the present specific embodiment is steel. This advantageously results in the same thermal expansion and a lower dynamic load on sealing areas. Moreover, the option exists to use more cost-effective gaskets.

An electromechanical servo or brake assistance force is supported, as an axial force, on spindle 42, spindle nut 43, gear wheel 44, and ball bearing 45 with the aid of a flange or clip ring on first housing half 5. From a ball bearing flange, the axial force is forwarded via a conical shoulder 46, similar to a disk spring, into the bottom of first housing half 5 to first support element 2a and second support element 2b. In contrast to a more rigid die-cast housing of first housing half 5, gearbox housing bottom 61 can yield during ABS pulsations, for example, and partially eliminate the high force pulses through damping.

Conical shoulder 46 converts the axial pressure force into a radial pressure force in gearbox housing bottom 61 of first housing half 5. There, a flexural stress superimposes the pressure force and partially compensates the same. Conical shoulder 46 thus significantly reduces the tensile and bending forces in gearbox housing bottom 61. Gearbox housing bottom 61 thus yields during force pulses and reduces these.

Ball bearing 45 is supported axially on a stamped hole edge and radially on a stamped hole 47. Due to diameter tolerances, a sliding seat can preferably be provided between hole 47 and ball bearing 45. A metal bushing 48 including an annular groove is pressed onto a ball bearing outer ring. Without servo assistance, the driver thus has mechanical access to master brake cylinder 7. In this mode, ball bearing 45 can be pulled out of hole 47. The press fit of metal bushing 48 preferably prevents this. Moreover, a bellows 49 is held by metal bushing 48.

Figure 3:
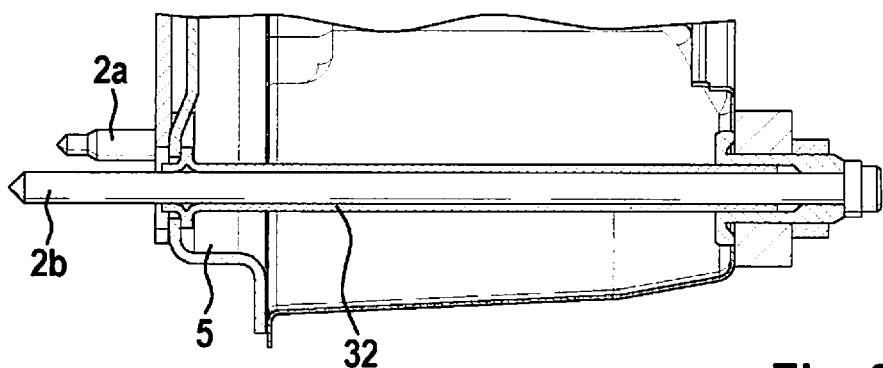
FIG. 3 shows an enlarged detailed view of a support element of the electromechanical brake booster for the motor vehicle shown in FIG. 2 according to the further example embodiment of the present invention.

FIG. 3 shows an enlarged detailed view of a support element of the electromechanical brake booster for the motor vehicle shown in FIG. 2 according to the further preferred example embodiment of the present invention.

Comparable to the embodiment of first support element 2a and of second support element 2b shown in FIG. 1 using a respective tie rod, a force flow in this example embodiment exists from master brake cylinder 7 via a pipe 32 to first housing half 5. Electromechanical brake booster 1 is attachable, preferably clampable, to the firewall (not shown in FIG. 3) of the motor vehicle via first support element 2a and second support element 2b.

Figure 4:
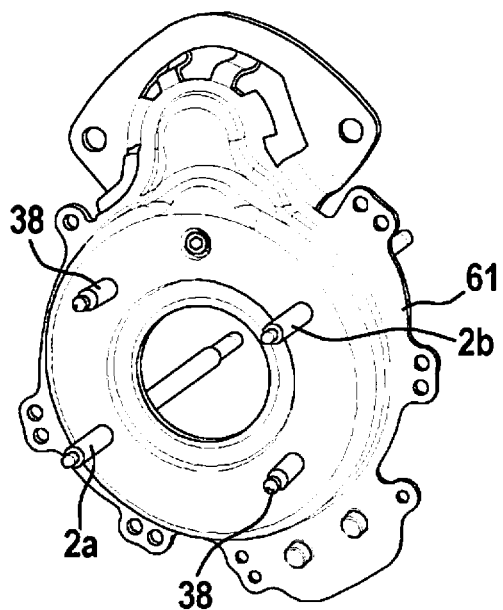
FIG. 4 shows a sectional view of a rear side of a gearbox housing bottom of the electromechanical brake booster for the motor vehicle according to an example embodiment of the present invention.

FIG. 4 shows a sectional view of a rear side of a gearbox housing bottom of the electromechanical brake booster for the motor vehicle according to the preferred example embodiment of the present invention.

In the present example embodiment, the gearbox housing includes four screw-on points on the firewall (not shown in FIG. 4) of the motor vehicle. First support element 2a and second support element 2b are preferably pressed into gearbox housing bottom 61. Moreover, two further fasteners 38 are provided on the rear side of gearbox housing bottom 61. Fasteners 38 are preferably designed as screws. The screws are preferably pressed into holes formed in gearbox housing bottom 61. By providing the four screw-on points, preferably four installation positions of the electromechanical brake booster are thus possible.

Figure 5:
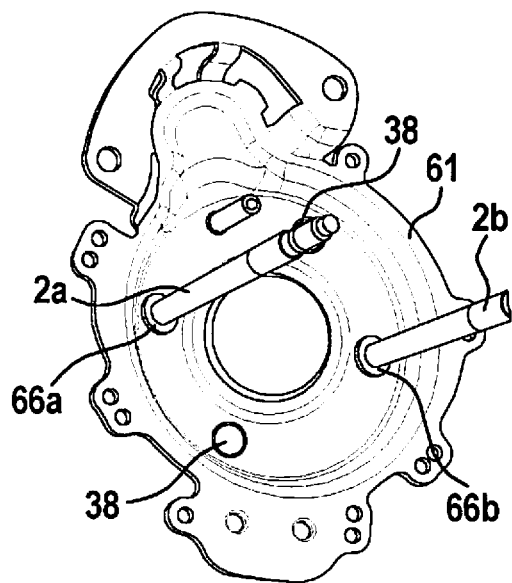
FIG. 5 shows a perspective representation of a front side of the gearbox housing bottom of the electromechanical brake booster for the motor vehicle according to an example embodiment of the present invention.

FIG. 5 shows a perspective representation of a front side of the gearbox housing bottom of the electromechanical brake booster for the motor vehicle according to this example embodiment of the present invention.

First support element 2a and second support element 2b are preferably pressed into gearbox housing bottom 61. A first bulge 66a and a second bulge 66b protrude from gearbox housing bottom 61 since collar 63a, 63b is pressed in on the rear side of gearbox housing bottom 61. A rear side of fasteners 38 preferably ends flush with the front side of gearbox housing bottom 61.

Further flexibility with respect to an installation space can preferably be gained in that the electromechanical brake booster is present in a non-mirrored, or alternatively in a mirrored, version. A mirror plane, which is not shown in FIG. 5, is situated, for example, orthogonally and centrally between first support element 2a and second support element 2b. Electric motor 21 (not shown in FIG. 5) is preferably situated at a predefined angle to the mirror plane. During mirroring, electric motor 21 thus only changes the side with reasonable complexity. Thus, only the components of the first housing half and of the second housing half are additionally provided as a mirrored version. The predetermined angle is preferably 30°±10°.

Figure 6:
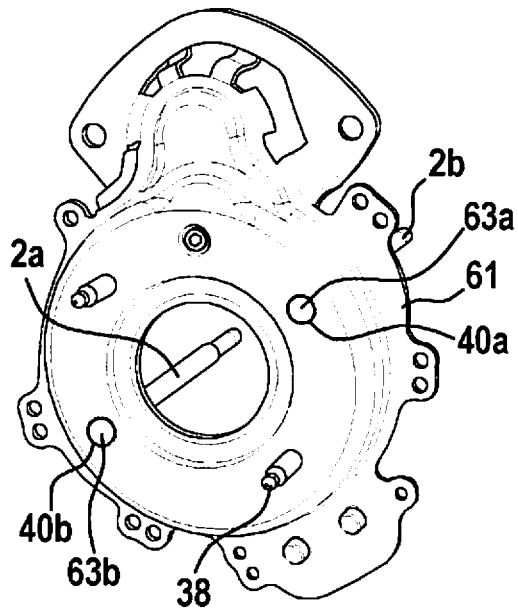
FIG. 6 shows a perspective representation of the rear side of the gearbox housing bottom of the electromechanical brake booster for the motor vehicle according to another example embodiment of the present invention.

FIG. 6 shows a perspective representation of the rear side of the gearbox housing bottom of the electromechanical brake booster for the motor vehicle according to a further preferred example embodiment of the present invention. In this example embodiment, first support element 2a and second support element 2b end flush with the rear side of gearbox housing bottom 61. Fasteners 38 implemented as screws are attached to the rear side of gearbox housing bottom 61 and used for fastening the electromechanical brake booster on the firewall (not shown in FIG. 6) of the motor vehicle. First support element 2a and second support element 2b are preferably pressed into a respective opening 40a, 40b of gearbox housing bottom 61.

Figure 7:
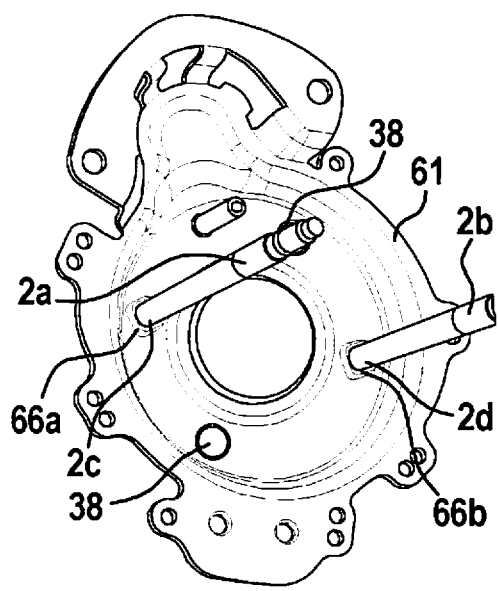
FIG. 7 shows a perspective representation of the front side of the gearbox housing bottom of the electromechanical brake booster for the motor vehicle according to the other example embodiments of the present invention.

FIG. 7 shows a perspective representation of the front side of the gearbox housing bottom of the electromechanical brake booster for the motor vehicle according to this example embodiment of the present invention. As mentioned above, first support element 2a and second support element 2b are preferably pressed into respective openings 40a, 40b of gearbox housing bottom 61. A first bulge 66a and a second bulge 66b protrude from gearbox housing bottom 61 since collar 63a, 63b is pressed in on the rear side of gearbox housing bottom 61. A respective rear side of fasteners 38 is designed to be flush with the front side of gearbox housing bottom 61.

Figure 8:
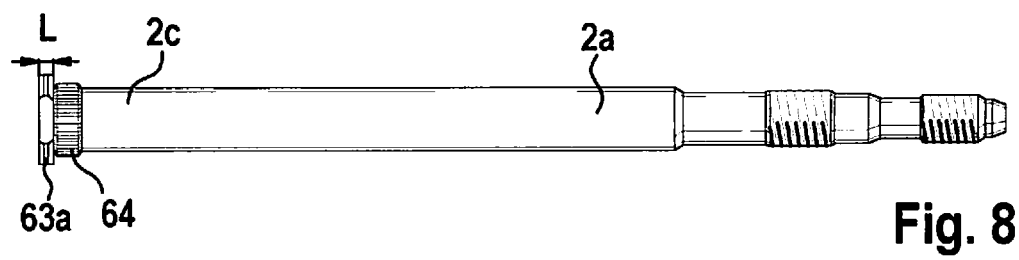
FIG. 8 shows a perspective representation of the support element of the electromechanical brake booster for the motor vehicle according to an example embodiment of the present invention.

FIG. 8 shows a perspective representation of the support element of the electromechanical brake booster for the motor vehicle according to a preferred example embodiment of the present invention. Adjoining collar 63a, a knurl 64 is formed at first axial end section 2c of first support element 2a. A length L of knurl 64 is preferably larger than a thickness D of gearbox housing bottom 61 (not shown in FIG. 8). Knurl 64 can preferably be pressed into the opening formed in the gearbox housing bottom. The knurl situated in a protruding manner on a side of the gearbox housing bottom situated opposite the press-in side is calkable or pressable.

Figure 9:
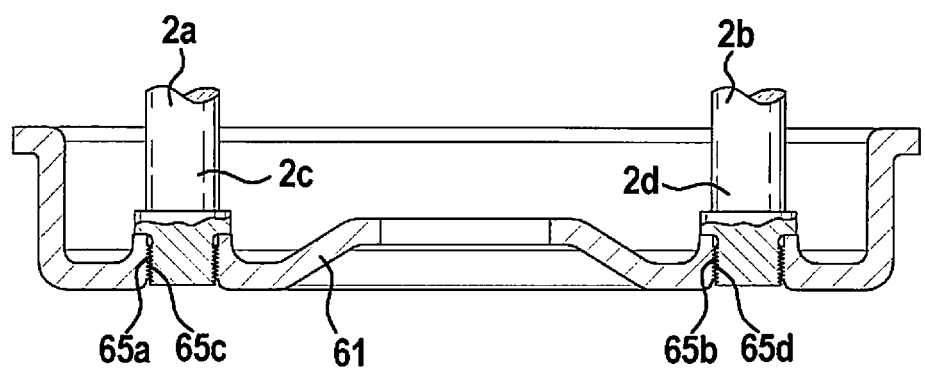
FIG. 9 shows a perspective representation of the gearbox housing bottom including mounted support elements of the electromechanical brake booster for the motor vehicle according to an example embodiment of the present invention.

FIG. 9 shows a perspective representation of the gearbox housing bottom including mounted support elements of the electromechanical brake booster for the motor vehicle according to a further preferred example embodiment of the present invention.

Gearbox housing bottom 61 preferably includes a first passage 65a and a second passage 65b. First passage 65a preferably includes an internal thread 65c, and second passage 65b preferably includes an internal thread 65d. First passage 65a preferably accommodates an axial end section 2c of first support element 2a. Second passage 65d preferably accommodates axial end section 2d of second support element 2b. In this way, preferably a more robust connection to gearbox housing bottom 61 and the same installation direction as fasteners 38 designed as screws are achievable.

Although the present invention has been described above based on preferred exemplary embodiments, it is not limited thereto, but is modifiable in a variety of ways. The present invention can in particular be changed or modified in multiple ways without departing from the core of the present invention.

For example, a length of the electromechanical brake booster is adaptable, for example, by varying a diameter of the first support element and of the second support element, and thereby reducing the length of the first support element and of the second support element.

What is claimed is:

1. An electromechanical brake booster for a motor vehicle, the brake booster comprising:

a spindle adapted to be moved in the brake booster according to a translational movement;
a gearbox housing bottom;
at least one support element:
: that extends essentially in parallel to a longitudinal axis of the spindle and that is attached to the gearbox housing bottom;
: to which a master brake cylinder is attachable; and
: that is designed to support forces acting on the at least one support in at least one of an axial direction and a radial direction; and a housing that includes a first housing half, and a second housing half, which at a first axial end section is attached to the first housing half and at a second axial end section is attachable to the master brake cylinder, wherein:
: the first housing half is attachable to a fastening point on a firewall of the motor vehicle; and
: the at least one support element extends through an opening in the gearbox housing bottom and is attachable to the fastening point of the firewall of the motor vehicle.

2. The electromechanical brake booster of claim 1, wherein:
the at least one support element is essentially cylindrical; and
the first housing half is attached to the second housing half by at least one fastener situated on the at least one support element and with which the master brake cylinder is attachable to the at least one support element.

3. The electromechanical brake booster of claim 1, wherein:
the first housing half is attachable to a further fastening point of the firewall of the motor vehicle; and
an essentially cylindrical fastener is connected to the gearbox housing bottom and is attachable to the further fastening point of the firewall of the motor vehicle.

4. The electromechanical brake booster of claim 1, wherein the first housing half is an aluminum die-cast housing, and the second housing half is a plastic housing.

5. The electromechanical brake booster of claim 1, wherein the first housing half and the second housing half are steel sheet housings.

6. The electromechanical brake booster of claim 1, wherein the gearbox housing bottom includes a passage that includes an internal thread and that accommodates an axial end section of the at least one support element.

7. The electromechanical brake booster of claim 1, wherein the at least one support element includes a steel tie rod or a through bolt.

8. An electromechanical brake booster for a motor vehicle, the brake booster comprising:
a spindle adapted to be moved in the brake booster according to a translational movement;
a gearbox housing bottom;
at least one support element:
: that extends essentially in parallel to a longitudinal axis of the spindle and that is attached to the gearbox housing bottom;
: to which a master brake cylinder is attachable; and
: that is designed to support forces acting on the at least one support in at least one of an axial direction and a radial direction, wherein:
: the at least one support element is pressed through an opening formed in the gearbox housing bottom; and
: a collar formed at a first axial end section of the at least one support element rests against the gearbox housing bottom.

9. The electromechanical brake booster of claim 8, wherein a knurl that:
adjoins the collar;
has a length that is larger than a thickness of the gearbox housing bottom;
is formed at the first axial end section of the at least one support element;
is pressed into an opening in the gearbox housing bottom; and
is situated in a protruding manner, at which the knurl is caulked or pressed, on a side of the gearbox housing bottom situated that is opposite the press-in side.

10. A braking system of a motor vehicle, the braking system comprising:
an electromechanical brake booster; and
a master brake cylinder that is actuatable by the brake booster;
wherein the brake booster includes:
: a spindle adapted to be moved in the brake booster according to a translational movement;
: a gearbox housing bottom;
: at least one support element:
:: that extends essentially in parallel to a longitudinal axis of the spindle and that is attached to the gearbox housing bottom;
:: to which a master brake cylinder is attachable; and
:: that is designed to support forces acting on the at least one support in at least one of an axial direction and a radial direction; and
: a housing that includes a first housing half, and a second housing half, which at a first axial end section is attached to the first housing half and at a second axial end section is attachable to the master brake cylinder, wherein:
:: the first housing half is attachable to a fastening point on a firewall of the motor vehicle; and
:: the at least one support element extends through an opening in the gearbox housing bottom and is attachable to the fastening point of the firewall of the motor vehicle.

* * * * *